Nov. 29, 1966  W. A. VELLRATH  3,288,055
PACKAGING APPARATUS
Filed July 18, 1963  13 Sheets-Sheet 1

INVENTOR
WERNER ARTHUR VELLRATH

BY *Harry E. Braddock*
ATTORNEY

Nov. 29, 1966 W. A. VELLRATH 3,288,055
PACKAGING APPARATUS
Filed July 18, 1963 13 Sheets-Sheet 5

INVENTOR
WERNER ARTHUR VELLRATH

BY
ATTORNEY

Nov. 29, 1966 W. A. VELLRATH 3,288,055
PACKAGING APPARATUS
Filed July 18, 1963 13 Sheets-Sheet 7

INVENTOR
WERNER ARTHUR VELLRATH

BY *Harry E. Braddock*
ATTORNEY

FIG. 15

INVENTOR
WERNER ARTHUR VELLRATH
BY
Harry E. Braddock
ATTORNEY

United States Patent Office 3,288,055
Patented Nov. 29, 1966

3,288,055
PACKAGING APPARATUS
Werner Arthur Vellrath, Landenberg, Pa., assignor to E. I. du Pont de Nemours and Company, Wilmington, Del., a corporation of Delaware
Filed July 18, 1963, Ser. No. 295,961
9 Claims. (Cl. 100—4)

This invention relates generally to the field of apparatus for forming bundles of elongated elements and applying elastic bands thereto. More specifically, the invention involves a new and improved apparatus combination for continuously receiving a stream of elongated filaments, or bristles, converting the stream of filaments into a series of uniform groups of filaments, and applying at least one elastic band around the outside of each group to form a compact bundle of substantially parallel filament elements having a convenient size and shape for further handling.

In the past this operation has been performed by individuals who would manually gather a moving stream of elongated elements into individual groups and then manually apply one or more elastic bands to form each bundle.

It is an object of this invention to accomplish continuous, automatic, and more rapid formations of banded bundles by a new and improved apparatus combination. This will result in faster and more economical handling of this material with benefits to both the consumer and producer.

It is another object of this invention to provide such an apparatus combination which is effective, reliable, and flexible in operation to handle elongated objects of various sizes, rugged in design, yet reasonably economical to fabricate, maintain, and repair.

Other objects and advantages will appear from a consideration of the following specification, the claims, and the accompanying drawings in which:

Figure 1:
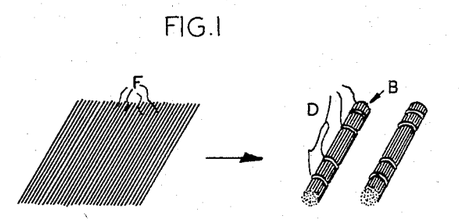
FIGURE 1 is a perspective illustration of a stream of elongated elements and the resulting banded bundles formed by the apparatus of the present invention.

The over-all actiton of the apparatus of this invention is illustrated generally in FIGURE 1 in which a continuous unbroken row or array of laterally aligned elongated elements is converted into a series of compact bundles with at least one circumferentially extending band engaging the bundle periphery.

Figure 2:
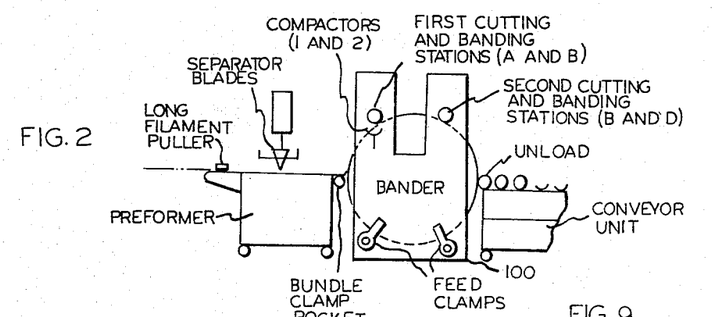
FIGURE 2 is a general diagrammatic side elevation of the major component units of the apparatus combination embodying principles of this invention.

As shown in FIGURE 2, the apparatus of this invention comprises very generally a preformer unit 1 which separates the continuous array of elongated elements or filaments into groups and then forms the groups into even compact bundles for transfer to the next unit; a bundle-banding unit 100 which moves the bundles through successive banding stations at which stations the bands are formed and transferred into position around the bundles, and a conveyor unit for receiving and removing the banded bundles. The entire operation is carried out continuously and automatically, the action of each unit synchronized with the action of the other units in a manner to be described hereinafter.

The elongated elements, which are bristles or filaments in the preferred embodiment of the apparatus, may be continuously supplied, in an array as shown in FIGURE 1, to the preformer unit from an automatic cutting and orienting machine (not shown).

Figure 3:
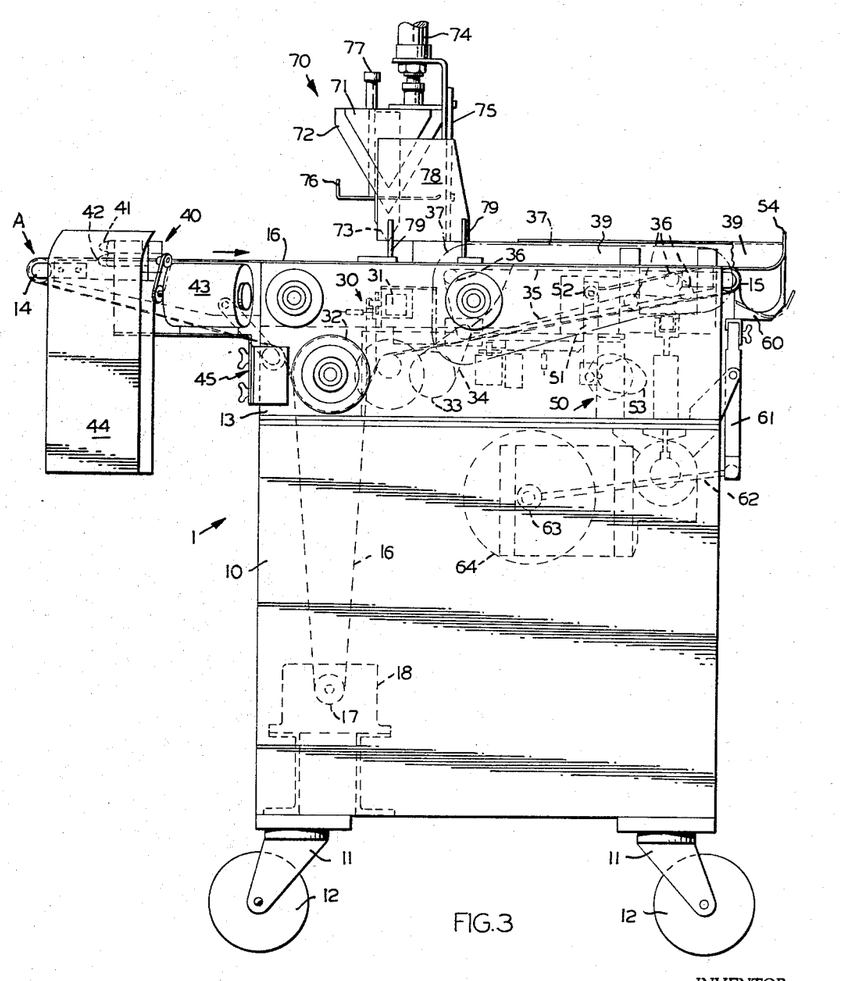
FIGURE 3 is a side elevational view of the bundle preformer unit of this invention.
Figure 4:
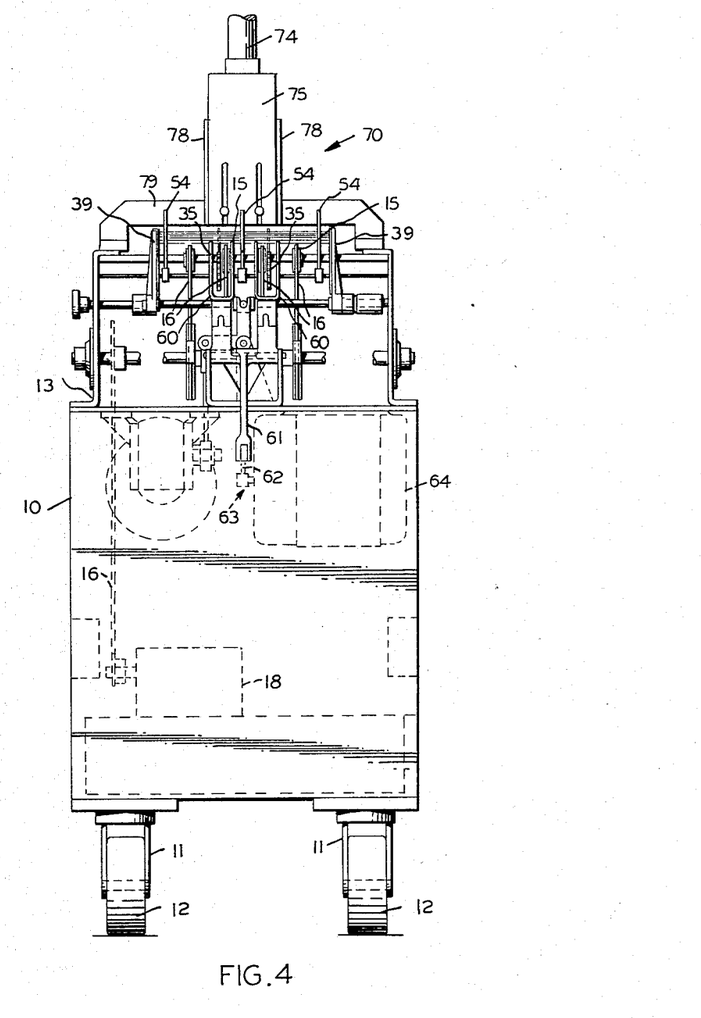
FIGURE 4 is an end view of the bundle preformer unit shown in FIGURE 3.
Figure 11:
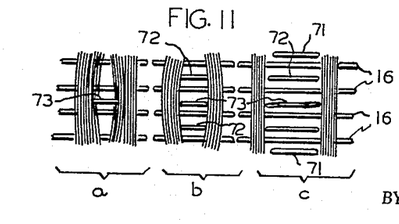
FIGURE 11 is a series of enlarged schematic partial plan views of a portion of the bundle preforming unit illustrating the action of the assembly which initially separates the continuous stream or array of filaments into spaced groups of filaments.
Figure 20:
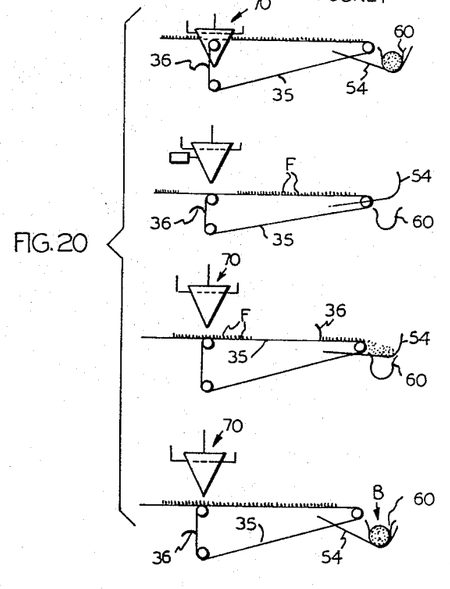
FIGURE 20 illustrates, in a schematic three position sequence, the timing cycle and functioning of the bundle preformer unit and its major assemblies.

The preformer unit is disclosed in FIGURES 3 and 4 and the major aspects of its functioning cycle are shown schematically in FIGURES 11 and 20.

The preformer unit comprises a lower housing 10 carried on rollers 12 mounted in brackets 11, and an upper housing 13 secured by suitable means to lower housing 10.

At each end of the upper housing 12 is mounted a set of four pulley wheels, one set of such wheels 14 is mounted at the bristle-receiving end A of the preformer unit and the other set of such wheels 15 is mounted at the other end of the unit at which the bristles are removed in bundles. Four horizontal conveyor belts 16 are engaged and supported by the sets of wheels 14 and 15. The belts 16 are drawn continuously in the direction indicated in FIGURE 3 by a set of drive pulleys 32 which are driven by another endless chain or belt 16 which is in turn driven by sprocket wheel 17 affixed to the drive shaft of a suitable motor 18. At the discharge end of the conveyor belts 16 a bristle receiving pocket or recess is formed by cradle elements 60 which are suitably mounted on the housing members. Cradle elements 60 are connected by linkage elements 61 and 62 to an eccentric device 63 driven by motor 64 so that operation of the motor and device 63 vibrate the cradle elements principally in a horizontal direction and transversely of bristles received in the recess formed by elements 60. Two opposed vertical guiding and tamping plate members 39 are mounted along the outermost conveyor belts 16 near the discharge end of the preformer unit. Members 39 guide and tamp the ends of filaments carried between them by the belts 16. These members are vibrated in a direction substantially parallel to the filaments carried by the belts, in a manner similar to cradle elements 60, by means of the motor and eccentric unit indicated at 395.

A bristle separator assembly 70 is mounted on the upper housing 13 and comprises a plurality of laterally spaced tapered separator blades 71, 72, and 73 which are vertically reciprocated by pneumatic motor 74. The separator blades are arranged so that upon downward motion caused by motor 74 the blades engage the continuous array of bristles on the conveyor belts 16 as shown in FIGURE 11 progressively in steps from the middle portion of the conveyor toward the outside edges of the conveyor so that the bristles are separated clearly into groups without entangling between the groups. A vertical tamper element 76 with weight 77 is carried by the vertically reciprocating portion of assembly 70 for engaging and tamping the filaments on the belts during operation of the bristle separator blades.

Two sets of endless chains 35 extend along a path which substantially coincides with the discharge end portion of the conveyor formed by belts 16. Chains 35 are mounted for movement on sprocket wheels 36 which in turn are suitably mounted in the upper housing 13. Each chain 35 carries a sweep finger element 36 affixed thereto in a rest position shown in FIGURE 3. Chains 35 are operated simultaneously to move the sweep finger elements 36 periodically through the entire path indicated by the reference numeral 37 in FIGURE 3. Chains 35 and the sweep finger elements are driven through their cycle by a 360° intermittent drive clutch device 30 comprising generally solenoid 31, continuously driven input gear 32, output gear 33, intermediate drive chain 34, and other conventional parts not shown. The sweep fingers 36, in the effective portion of their movement, extend upwardly between the belts 16, as shown in dotted lines in FIGURE 4, and sweep or move the group of bristles which have been separated from the incoming continuous array of bristles by the separator blades into engagement with elements 54 and the recess formed by cradle elements 60. This sweeping movement is accomplished at a rate which is faster than the rate of movement of the conveyor belt 16. The sequence of the bristle separating, sweeping, and bundle-forming steps are shown schematically in FIGURE 20. Elements 54 are bristle lowering finger elements which receive the bristles moved along by the sweep finger elements 36 and lower them into the cradle elements 60 while maintaining the bristles in a substantially parallel unentangled condition. Elements 54 are secured to a transverse bar 52 which is fixed to the upper end of a generally vertically extending pivotable beam element 51 which is moved by a cam 53 engaging a cam follower roller at the lower end of the beam element to elevate and lower the extremities of elements 54.

Figure 12:
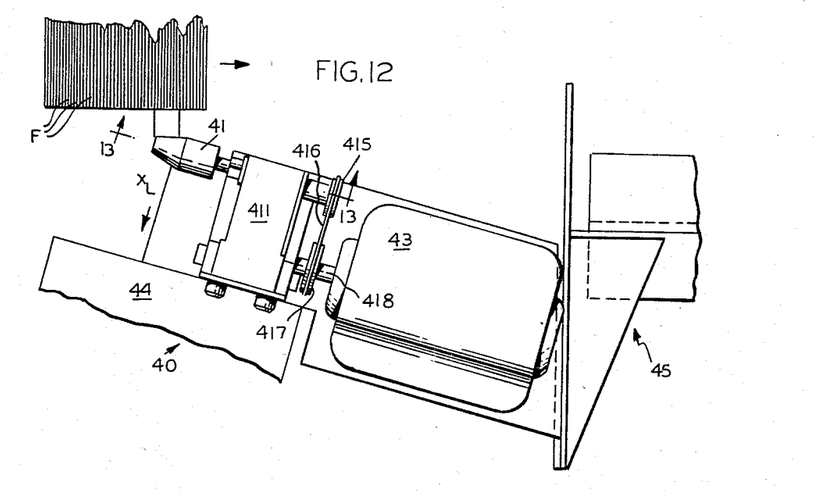
FIGURE 12 is an enlarged partial plan view of a long filament puller assembly of the bundle preformer unit with certain parts broken away.
Figure 13:
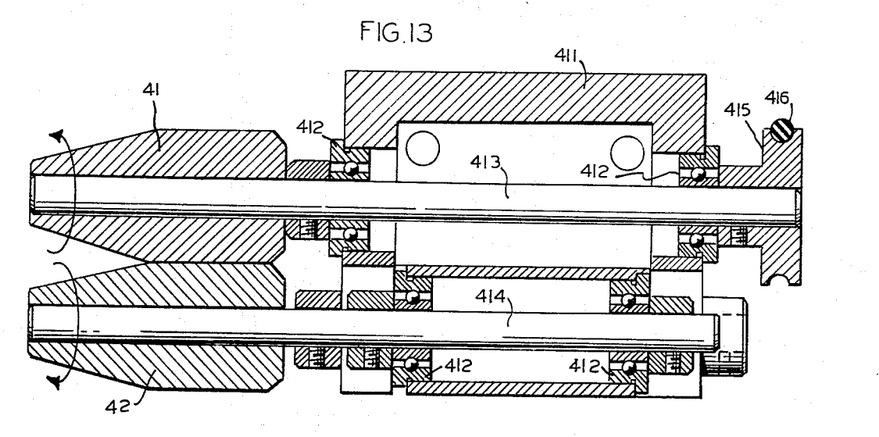
FIGURE 13 is a further enlarged partial vertical cross-sectional view of the long filament puller assembly of FIGURE 12 taken at line 13—13 of that figure.

A long filament puller assembly 40 is mounted near the bristle-receiving end of the preformer unit. This assembly is shown in FIGURE 3 and also shown in greater detail in FIGURES 12 and 13. This assembly comprises, in general, two vertically aligned and engaged tapered roller elements 41 and 42 of a suitable resilient material. These roller elements 41 and 42 are rotated continuously by means of motor 43, pulleys 415 and 417, and belt 416 and are positioned with their axes in a plane parallel to the plane of bristles on the adjacent conveyor belts 16 and also at an angle to the direction of movement of the belts and bristles. The roller elements are positioned so that bristles or filaments which project significantly beyond the edges of the moving array of filaments or bristles are engaged between the tapered portions of the rollers 41 and 42 and rapidly withdrawn from the array without disturbing the alignment of adjacent filaments.

Figure 5:
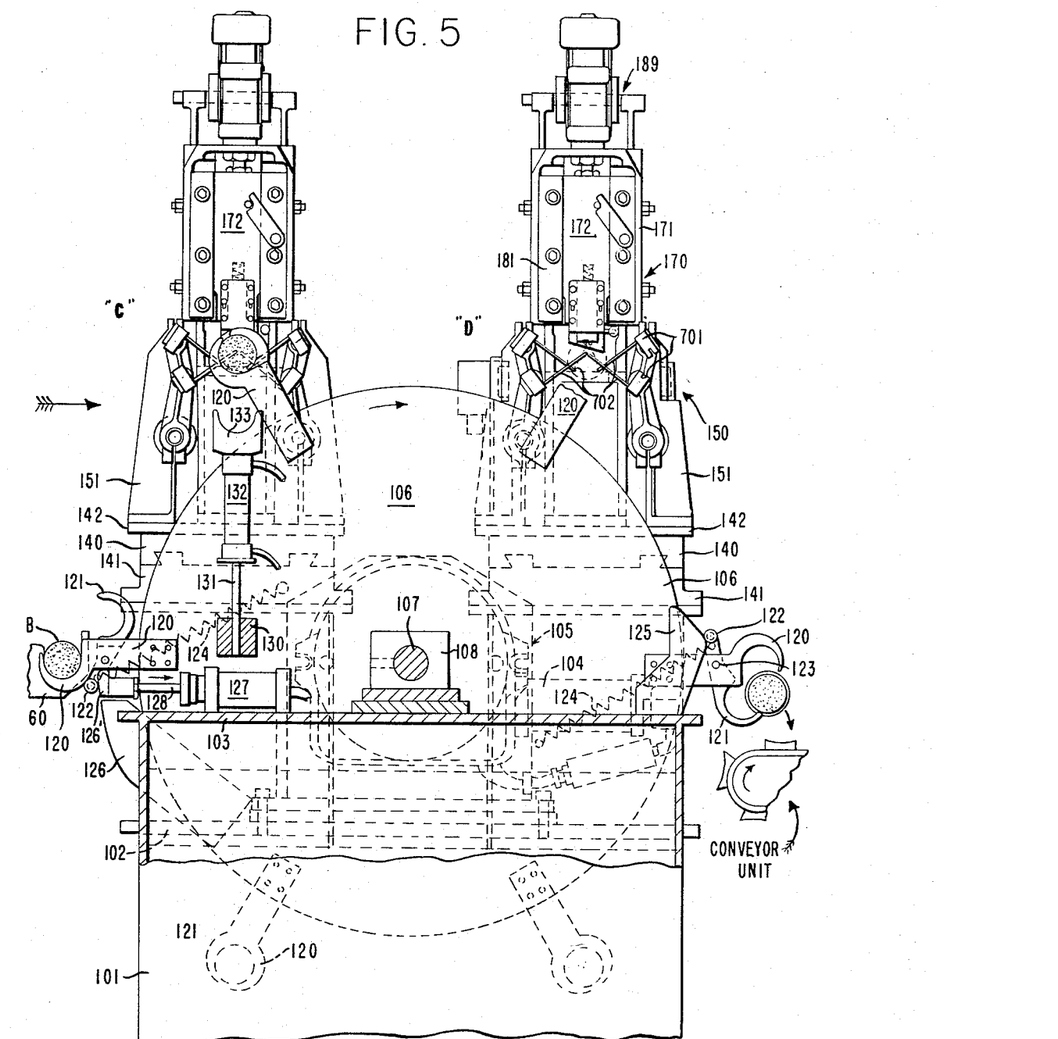
FIGURE 5 is a vertical cross-sectional view of the bundle banding unit of this invention taken at line 5—5 of FIGURE 6 with certain parts broken away to more clearly show the various parts.

The bundle banding unit of the apparatus is positioned adjacent the discharge end of the preformer unit, as shown in FIGURES 2 and 5. The banding unit is shown generally and with some detail in FIGURES 5 and 6. The banding unit comprises generally a base or supporting housing 101, a rotary transfer wheel member 106 carrying a plurality of sets of bundle clamping elements 120 and 121 sequentially through a plurality of banding stations. As shown in the drawings, there are four banding stations in opposed sets of two. At each banding station is a tube feeding assembly 500, a tube cutting assembly 170 for cutting bands from a continuous roll of tubing, and a band transfer assembly 150 for transferring a cut band into position around the periphery of a bundle supported at that station on the rotary transfer wheel member. At the first banding stations encountered by a bundle of bristles being carried by the transfer wheel member, is located a pair of compactor assemblies 132–133 for supporting the lower outer portions of the bundle until the first bands are applied. In the preferred embodiment of the apparatus shown, two bands are applied to the bundle at the first two stations "A" and "C," two bands are applied at the next two stations "B" and "D," and then the banded bundles are released to a conveyor unit which carries the bundles on for further handling.

Figure 6:
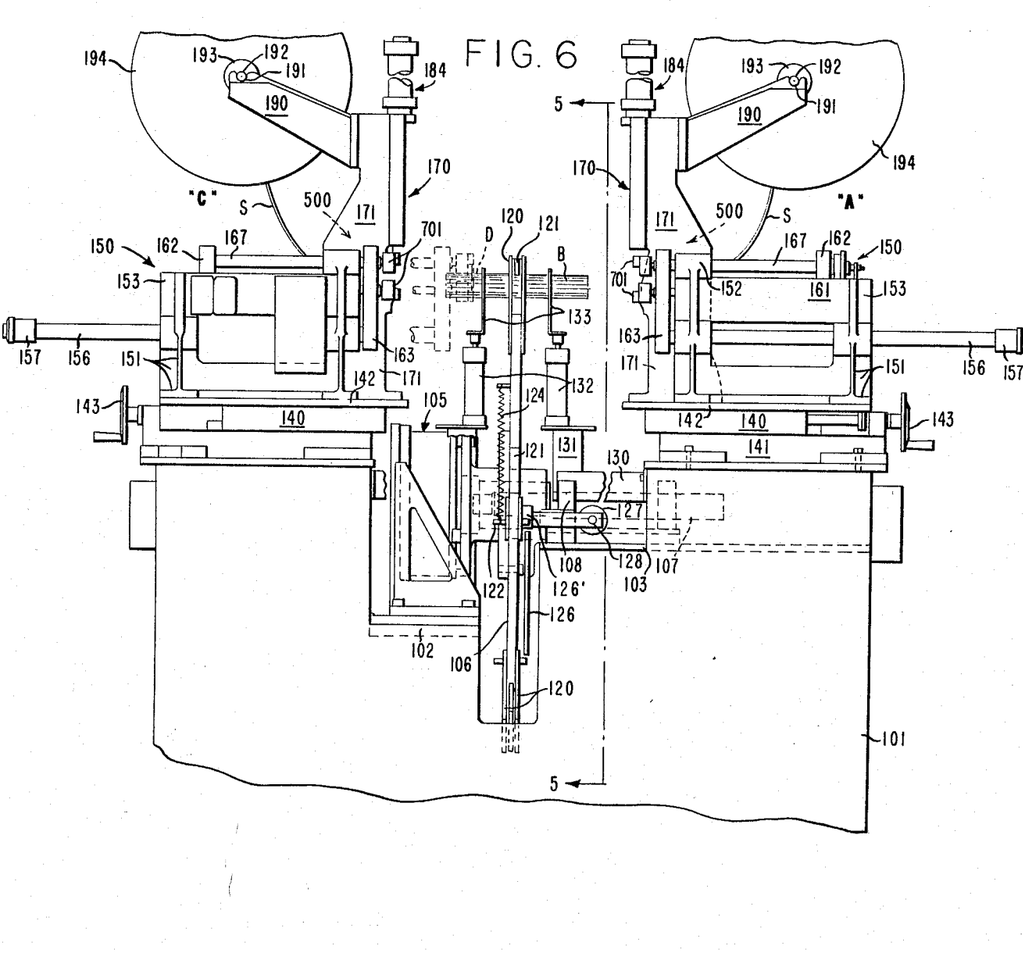
FIGURE 6 is an end view of the bundle banding unit shown in FIGURE 5 as viewed in the direction of the arrow in FIGURE 5.

As is most clearly shown in FIGURES 5 and 6, the transfer wheel member 106 is rotatably supported on horizontal shaft 107 which is journalled in block 108. Wheel member 106 rotates in a substantially vertical plane in a central opening formed in supporting housing 101. Block 108 is supported on a horizontal shelf element 103 carried by housing 101. A suitable rotary indexing mechanism 105 for rotating wheel member 106 in a step-by-step manner is supported on shelf element 102 of the housing 101. The indexing mechanism 105 is actuated by a reciprocating pneumatic piston unit 104 of conventional type.

A plurality of bristle bundle clamping devices are circumferentially spaced around the periphery of wheel member 106 and these devices each comprise a fixed clamp element 120 rigidly fixed to the wheel member and a cooperating pivotally mounted clamp element 121. The pivotally mounted clamp elements 121 are resiliently urged into the closed or clamping position by helical springs 124 connected between one end of the clamping element and a point on the wheel member. Pivotally mounted clamp elements 121 are cammed into open position by engagement of the cam rollers 122 with cam 125 at the bundle discharge position and by engagement with a camming means consisting of fixed cam 126 and movable cam 126' at the bundle receiving position. Movable cam 126' is retracted by action of reciprocating pneumatic motor unit 127 to permit clamping of a bundle at the bundle receiving position by action of the springs 124 upon the pivotally mounted clamp elements.

FIGURE 5 illustrates the movement of the transfer wheel member 106 and bundle clamping elements in transporting bundles into position at each of the banding stations.

FIGURE 6 which is an end view of the transfer wheel member and associated structure, as seen from the bundle receiving end, illustrates the band slide transfer movement and the band tube supply reel supporting assembly which comprises parts 190, 191, 192, 193 and 194.

The band transfer assembly 150, the band cutting assembly 170, and the band tube feeding assembly 500 of each of the four banding stations are mounted on plate member 142 which is secured in a suitable manner to base block 140. Base block 140 of each banding station cooperates with another lower base block 141 to permit sliding motion of these assemblies toward and away from the transfer wheel member 106. The sliding movement of base block 140 relative to base block 141 is controlled by a conventional screw drive actuating mechanism driven by the handwheel 143 at each station.

Figures 7, 8:
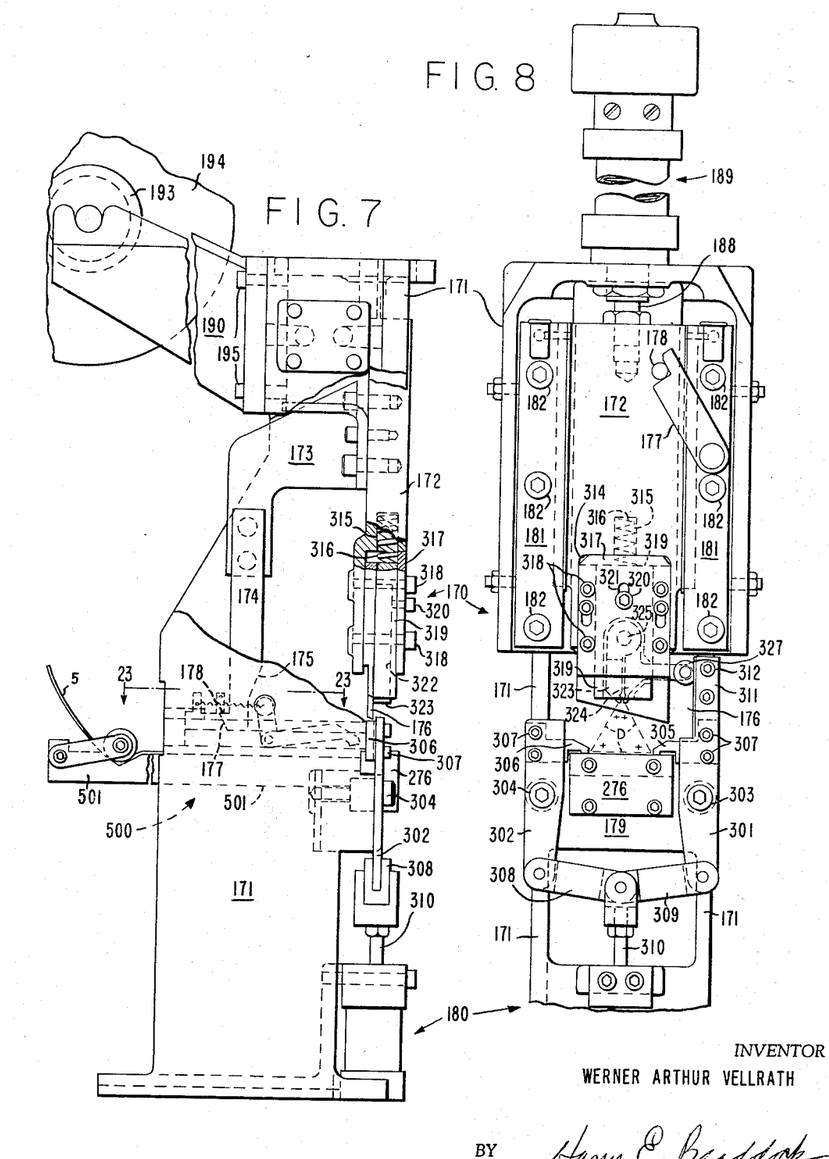
FIGURE 7 is an enlarged side elevational view of a band tube feeding and cutting assembly of the present invention with certain parts broken away.
FIGURE 8 is an enlarged front view of the band tube feeding and cutting assembly of FIGURE 8 with certain parts broken away.

As seen best in FIGURES 7 and 8, at each banding station a vertical frame unit 171 is mounted on plate member 142 and supports the bracket 190 which rotatably carries the band tube supply reel 194, houses the band tube feed mechanism 500, and also houses the band cutting mechanism. These frame units 171 are mounted in opposed pairs at each banding station.

A vertically disposed crosshead element 172 is mounted for vertical reciprocating movement on frame unit 171. Crosshead element 172 is reciprocated by pneumatic motor unit 189 which is provided with a piston rod 188 operatively connected to the crosshead element by suitable means is shown in FIGURE 8. The lower end of crosshead element 172 is provided with a recess 314 in which is mounted movable knife or cutter element 176, a movable spring urged block 319, and a cover plate 317. The cutter element 176 and cover plate 317 are rigidly held in place on the crosshead element 172 by means of machine bolts 318. The block 319 is slidably received between the cutter element 176 and the cover plate 137 and is urged in a downward direction by engagement of the helical spring 316. Downward movement of block 319 is limited by bolt 320 which is in threaded engagement with the block and extends through a vertically disposed slot 321 in the cover plate 317. Block 319 is provided with a cavity 322 formed in one of its major faces. Two vertically disposed band gripping elements 323 and 324 are pivotally mounted for movement around horizontally disposed pivot pin 325. Band gripper element 324 is provided with a projecting portion 326 which extends through a lateral opening in block 319. A cam roller element 327 is rotatably mounted at the extremity of portion 326.

Movable cutter element 176 cooperates with a stationary cutter element 176' supported at the back edge of element 276 to cut individual bands from a flattened annular band tube which is fed step-by-step into position between the cutter elements by band tube feeding mechanism 500.

The band tube feeding mechanism 500 is actuated periodically by a vertical drive element 174 which is rigidly connected to crosshead 172 by suitable means as shown. Vertical drive element 174 is provided with a first inclined cam portion 175, a second inclined cam portion 177, and a flat step portion 178.

Figure 23:
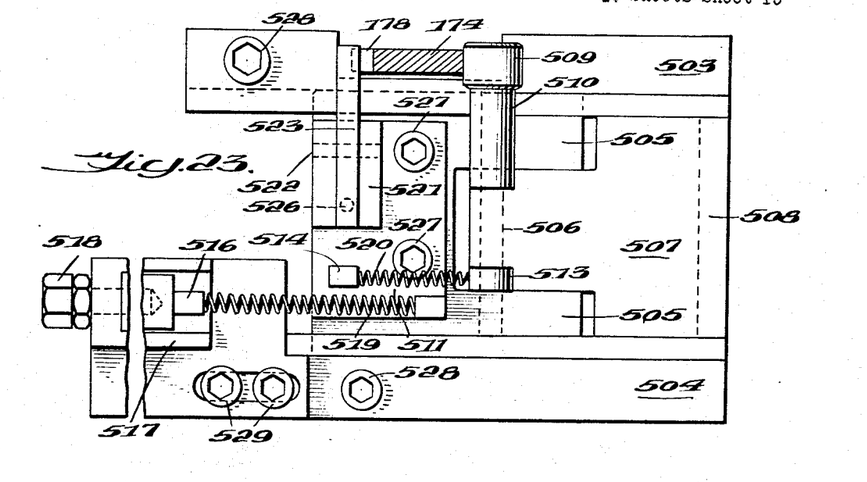
FIGURE 23 is an enlarged plan view of the band tube feeding device of the band tube feeding and cutting assembly of FIGURE 7 as viewed along line 23—23 of FIGURE 7.
Figure 24:
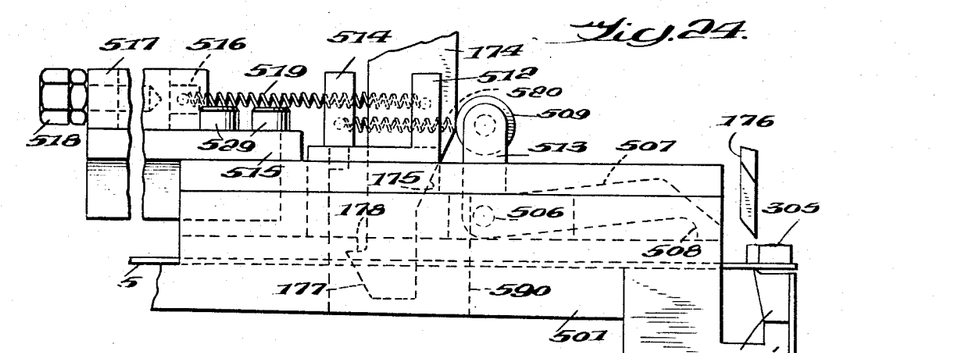
FIGURE 24 is an enlarged side elevational view of the band tube feeding device shown in FIGURE 23.
Figure 25:
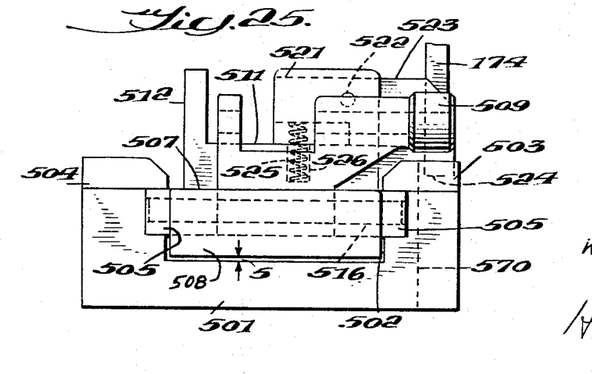
FIGURE 25 is an enlarged front end view of the band tube feeding device shown in FIGURE 23.

The flattened tube 5 is led from reel 194 between a pivoted roller assembly and a V-groove in the upper surface of plate element 501 and thence into engagement with the step-by-step band tube feeding mechanism 500. An enlarged showing of the band tube feeding mechanism 500 appears in FIGURES 23, 24, and 25. The band tube mechanism 500 generally comprises a horizontally disposed block element 505 slidably mounted in horizontal guideways formed between lower cut-out portions of plate 501 and upper guide elements 503 and 504 which are bolted to plate 500, as shown, block element 505 carrying bell crank lever member pivotally mounted on shaft or pin 506 and the lever member provided with a vertically extending lever arm 510 and a somewhat horizontally extending lever arm 507. The flattened tube 5 is positioned between block element 505 and plate 501, as shown in FIGURE 24. The extremity 508 of lever arm 507 is provided at its underside with a band tube gripping portion which periodically engages the flattened band tube 5 and moves it toward the cutter elements as block element 505 is reciprocated horizontally due to the vertical reciprocation of vertical drive element 174 carried by cross head 172 as will be described in the following discussion. Vertical drive element 174 is aligned with and reciprocates vertically in a cut-out portion 590 formed in block 501 and guide element 503. It will be seen from FIGURES 23, 24, and 25 of the drawings that a roller 509 is rotatably mounted at the upper extremity of vertically extending lever arm 510 and is positioned adjacent cut-out portion 590 and adjacent the line of movement of vertically reciprocating element 174. A helical tension spring 519 is connected between an adjustable element 516 supported by plate 515 on element 504, and an upwardly projecting element 512 fixed to the sliding block 505. This spring 519 resiliently urges block 505 and its pivoted bell-crank lever toward the left and away from the cutter elements, as viewed in FIGURES 23 and 24.

Another helical tension spring 520 is connected between an upstanding lug 513 on the bell-crank lever and upwardly projecting abutment 514 secured to the upper portion of sliding block 505. Spring 520 resiliently urges in bell-crank lever in the counterclockwise direction as viewed in FIGURE 24. It will be understood that in the rest position, the sliding block will be resiliently urged to the left and the bell-crank lever will be resiliently urged in a counterclockwise direction with its band tube engaging portion 508 held out of engagement with the flattened band tube S. Upon downward movement of crosshead 172 under the action of pneumatic motor 189 the vertical drive element 174 attached to the crosshead will also move downwardly. As this downward motion progresses, cam portion 175 on vertical drive element 174 engages the roller 509 to move the bell-crank lever in a clockwise direction as seen in FIGURE 24 so that portion 508 moves down into engagement with the band tube S. Continuation of the downward movement of vertical drive element 174 and its cam portion 175 then moves the sliding block and bell-crank lever against spring tension laterally to the right as seen in FIGURE 24 to feed the band tube S which is gripped by portion 508 of the lever to the right into position for the formation of a band by the cutter elements 176 and 176'. As the sliding block 505 reaches the limit of its movement to the right, spring urged latch element 523, which is pivotally mounted on block 505, drops into engagement in front of the vertical cut in guide element 503 to prevent return movement of the slide block under the action of the cross head with its attached element 174 and cutter element 176 continues until the cutter elements slice off the portion of band tube S which has been moved between the cutter elements by the feed assembly. Then the cross head 172 reverses its movement and rises taking with it attached vertical drive element 174 as the cam portion 175 on element 174 rises, spring 520 causes the bell-crank lever to return to the limit of its counterclockwise movement, raising lever portion 508 out of engagement with the band tube S. Further upward movement of element 174 hinges the flat step portion 178 thereof into engagement with the underside of latch element 523 to lift it out of engagement with the vertical cut in guide element 503 to permit the sliding block 505 and its bell crank lever to again move to the limit of its leftward movement as seen in FIGURE 24, ready for the next operating cycle. The pivotally mounted roller assembly seen cooperating with the band tube S and a V-notch in the upper surface of plate 501 causes a slight retracting movement of the portion of the band tube S between this assembly and the cutter elements so that the cut end of the band tube S will clear the lower edge of cutter element 176' and can be fed between the cutter elements smoothly upon the next actuation of the feeding assembly by element 174.

Figure 9:
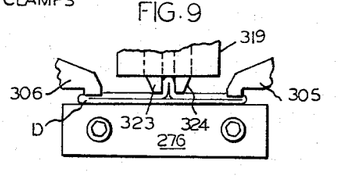
FIGURES 9 and 10 are enlarged front views of a portion of the structure shown in FIGURE 8 showing the details of a mechanism for engaging and opening up of the cut band prior to engagement of the band by the band transfer finger elements.
Figure 10:
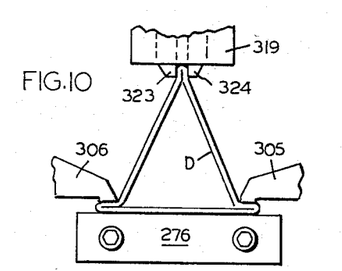

The portion of the band tube S which has been cut off by movable cutter element 176 to form a band, is supported upon the upper edge of lower stationary cutter element 176' and element 276. Immediately after this band has been cut it is engaged intermediate its ends by the downwardly moving gripping elements 323 and 324 carried on the lower end of cross head 172. This band is then also engaged at its ends by clamping elements 305 and 306 which are secured by bolts 307 to clamping lever elements 301 and 302 which are in turn pivotally mounted on pins 303 and 304 carried on structure 171. Lever elements are pivoted into and out of band clamping position by pneumatic piston motor 180 acting through rod 310 and links 308 and 309. The relationship of gripping elements 323, 324 and clamping elements 305, 306 are clearly shown in FIGURE 9. Before the return upward movement of the cross head 172 and gripping elements 323, 324 occurs, a portion of the band is bulged upwardly between the gripping elements as shown in FIGURE 9. Gripping elements are resiliently urged apart by a small helical spring not shown. At this time the motor 180 actuates clamping elements 305 and 306 into clamping position. This action also causes gripping element 324 to be moved toward gripping element 323 by means of roller 327 being engaged by an extension element 311 secured to the upper extremity of clamping lever element 301. Then as the cross head 172 reverses direction and moves upwardly the gripping elements and clamping elements cause the band to be opened up into a triangular configuration, as seen in FIGURE 10, for further handling.

Figure 17:
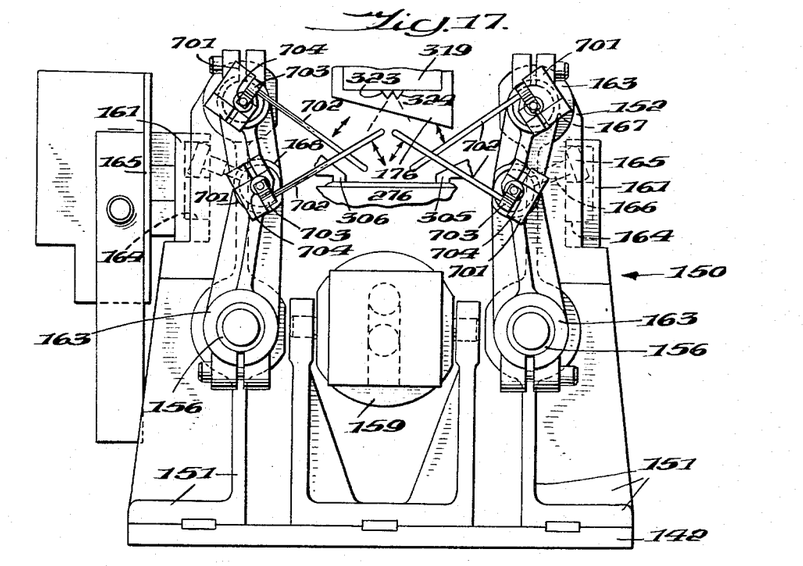
FIG. 17 is an end view of the band transfer slide assembly of FIGURE 16 as seen in the direction of the arrow in FIGURE 16.
Figures 18, 21, 22:
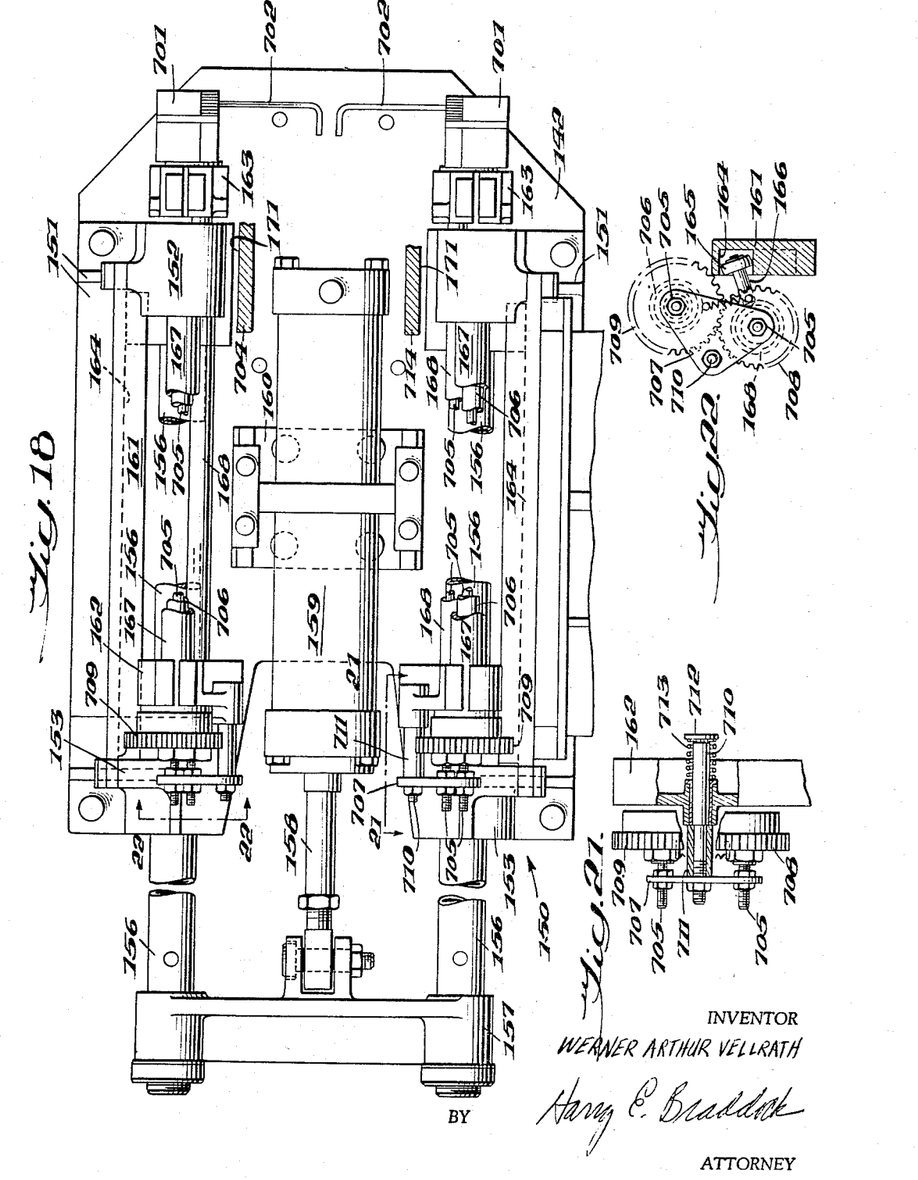
FIGURE 18 is a plan view of the band transfer slide assembly of FIGURES 16 and 17.
FIGURE 21 is a partial sectional view taken at line 21—21 of FIGURE 18 illustrating the details of the arrangement for actuating the band transfer finger elements to release a band on a filament bundle.
FIGURE 22 is a partial end view of a portion of the band transfer slide assembly of FIGURE 18 taken at line 22—22 to illustrate the details of the arrangement for actuating the band transfer finger elements to extend or give up a band element carried thereby.
Figure 19:
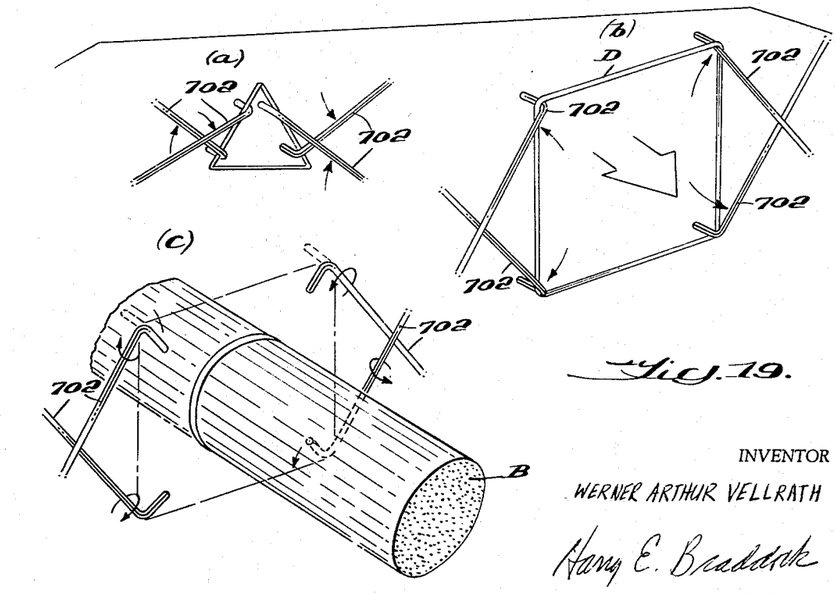
FIGURE 19 illustrates, in an enlarged three position sequential showing, how the band transfer finger elements engage, extend, and release a band element in position around a filament bundle.

A band transfer slide assembly 150 is positioned adjacent the band feeding and cutting assemblies at each banding station and generally engages the cut band in its opened-up triangular configuration and opens the band to a square configuration while translating the band into position around the end of a bristle bundle supported at that banding by the band transfer clamp elements of the wheel transfer member 106. The band transfer slide assembly comprises a main frame unit 151 secured to plate 142 of the banding unit. Frame unit 151 carries in bearing elements 154 and 155 two horizontal parallel slidably mounted drive shafts 156. Each drive shaft 156 is connected at its rear end with a cross-frame member 157 which is connected to a driving piston 158 of a reciprocating pneumatic motor unit 159 as seen in FIGURE 18. Drive shafts 156 extend along each side of frame unit 171 which houses the band tube feeding and cutting assemblies. Each shaft 156 is provided with two rigidly connected transverse vertically extending members 162 and 163. A shaft 167 parallel to shaft 156 rigidly interconnects the upper ends of members 162 and 163. Rotatably mounted in and extending between vertically extending members 162 and 163 on each shaft 156 are two additional parallel shafts 706 and 168. Shaft 706 is mounted inside shaft 167 as indicated. Rotatably mounted shafts 706 and 168 each are provided at their front ends with head elements 701 in which are mounted the band transfer finger elements 702. Shafts 706 and 168 together with head elements 701 are mounted for reciprocating movement with drive shaft 156 and for rotation in the vertically extending members 162 and 163. This reciprocating movement accomplishes the lateral transfer of a cut band from the band cutting location to the bundle in the transfer wheel bundle transfer clamps. There are two sets of drive shafts 156, rotary shafts 706 and 168, and two sets of two head elements 701, each head element having a band transfer finger 702, at each banding station as best shown in FIGURE 17. As the reciprocating movement of shafts 156, 706, 168 and the head elements occurs, the head elements and their shafts 167, 168 to which they are rigidly attached are rotated about the axes of shafts 167, 168 to rotate the band transfer finger elements 702 between the position shown in FIGURE 19(a) to that shown in FIGURE 19(b). This rotation is caused by a cam follower roller 165 mounted on a shaft 166 which is radially fixed to the rear end portion of each shaft 168. Roller 165 engages a cam groove 164 formed in a horizontally extending beam element 161 connected between portions 152 and 153 of frame unit 151 so that reciprocation of drive shaft 156 transmitted through members 162 and 163 to shaft 168 causes rotation of shaft 168 about its axis. This rotation is transmitted to head element 701 mounted on the front end of shaft 168. A drive gear 708 is rigidly mounted on shaft 168 and meshes with a driven gear 709 rigidly mounted on the rear end portion of shaft 706. It will be seen that rotation of the lower shaft 168 and its attached head element 701 is transmitted by means of the gears 708 and 709 to rotate the upper shaft 706 and its head element in the opposite direction. Each head element 701 carries an elongated L-shaped band transfer finger element 702 mounted therein not only to rotate with the head element about the shaft axis but also to rotate about its own axis. Each transfer finger element 702 is provided with a small pinion gear 703 rigidly secured to one end thereof which gear meshes with a small rack element 704 carried by a one end of push rod 705 slidably mounted in the head element and its supporting shaft. The other ends of the push rods extend through their respective shafts and are secured to a vertically disposed plate 707. Plate 707 is carried on a short horizontal shaft 710 which is resiliently slidably mounted in a portion of member 162 as shown in FIGURES 21 and 22. When the head elements and their supporting shafts have been moved toward the bristle bundle on the transfer wheel member which causes rotation of the head elements and finger elements as shown in FIGURES 19(a) and 19(b), the impact piece 712 on the forward end of shaft 710 strikes a portion 714 of vertical frame unit 171 and is moved to the left relative to the other structure shown in FIGURE 21. This displaces triangular plate 707 and the push rods 705 also to the left relative to the structure of FIGURE 21 and relative to the head elements 701. This relative movement moves the rack elements 704 in engagement with the pinion gears 703 to rotate the transfer finger elements 702 about their axes as shown in FIGURE 19(c) to release the band into position around the bristle bundle. The transfer finger elements, rack elements and push rods are returned to their normal positions by spring 713 upon reversal of the drive shaft 156 and associated parts in preparing to repeat the cycle. When the drive shafts 156 are connected reciprocating structures are in the retracted position as shown in FIGURE 6, the band transfer fingers 702 are positioned inside the recently cut band in its triangular position as shown in FIGURE 19(a). Action of pneumatic motor unit 180 releases the band gripping elements 323, 324 and also the band clamping elements 305, 306 which in turn releases the band on to the bent end portions of the band transfer elements 702. The drive shafts 156 and connected reciprocating structures are then extended to the position shown in dotted lines in FIGURE 6 at which time the transfer finger elements have moved to the position shown in FIGURE 19(b) holding the band around the end of the bristle bundle. Actuation of push rods 705 then rotates the transfer finger elements 702 as shown in FIGURE 19(c) to release the band to its final position around the bundle. A band is positioned at each end of the bundle simultaneously from opposite directions at each banding station. If desired, more than one band could be placed on the end of the bundle at each station if desired, by repeating the band cutting and transfer cycles without indexing the rotary transfer member and the bristle bundle. In the preferred embodiment shown, the bundle 3 is moved by the rotary transfer member 106 in one step from the cradle elements 60 of the preformer unit to the first two banding stations "A" and "C" where a band is placed on the bundle from each end, the member 106 moves the bundle in another step to the second two banding stations "B" and "D" where another band is placed on the bundle from each end, and member 106 moves the bundle in another step to the conveyor unit where it is released from member 106 and carried away by the conveyor unit.

Figure 14:
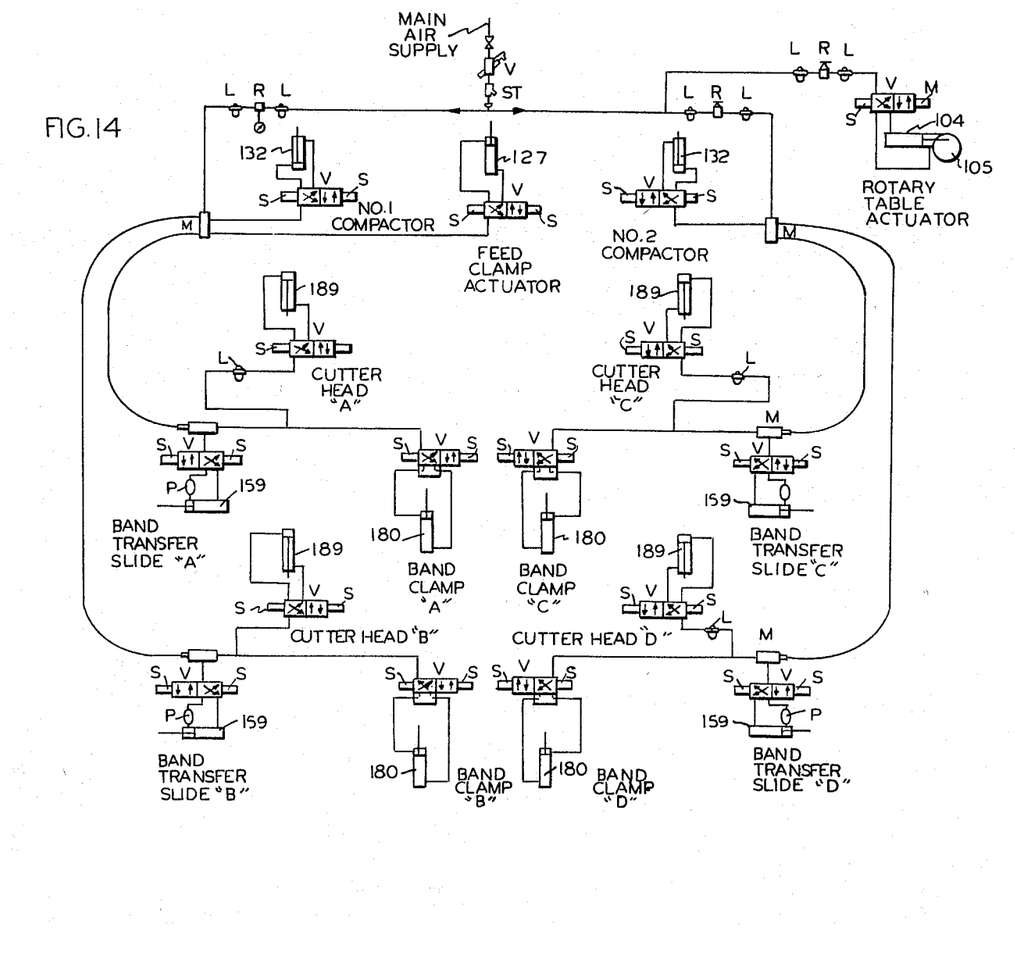
FIGURE 14 is a general schematic showing of the pneumatic system for operating the apparatus combination of this invention.
Figure 15:
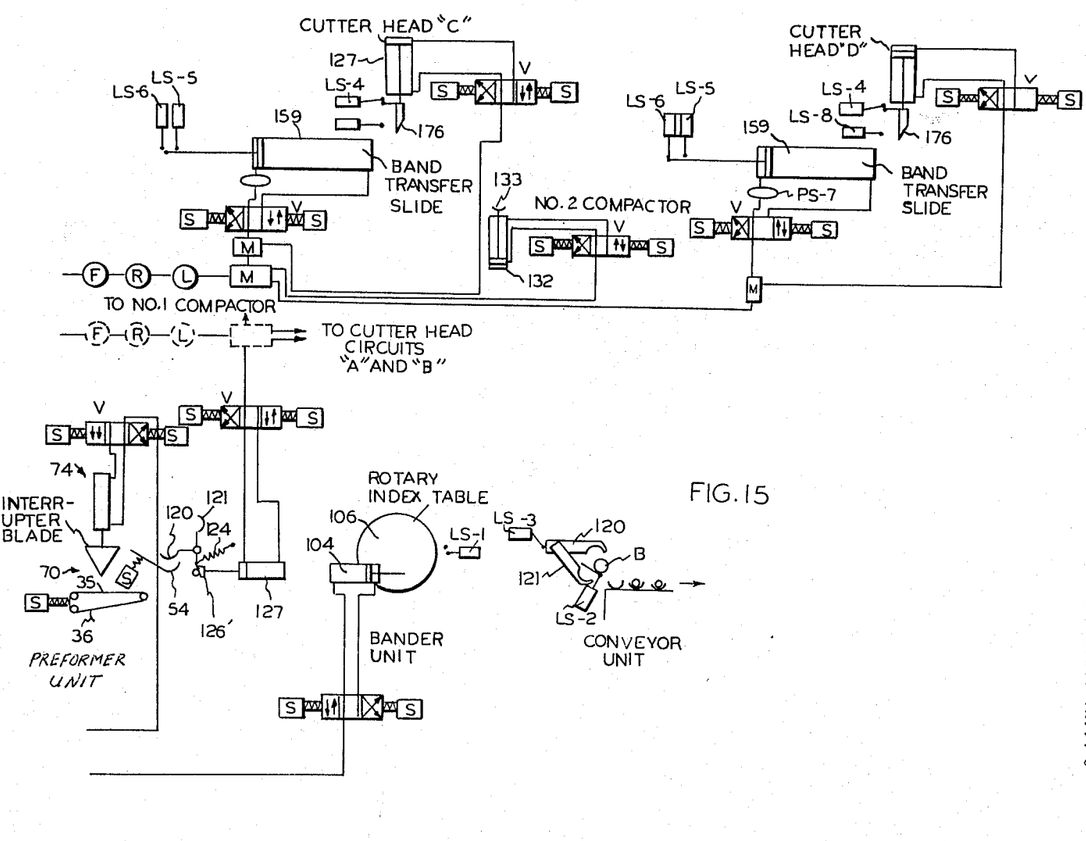
FIGURE 15 is a general schematic showing of the limit stop arrangement which in conjunction with the pneumatic system of FIGURE 14 controls the operation of the apparatus.
Figure 16:
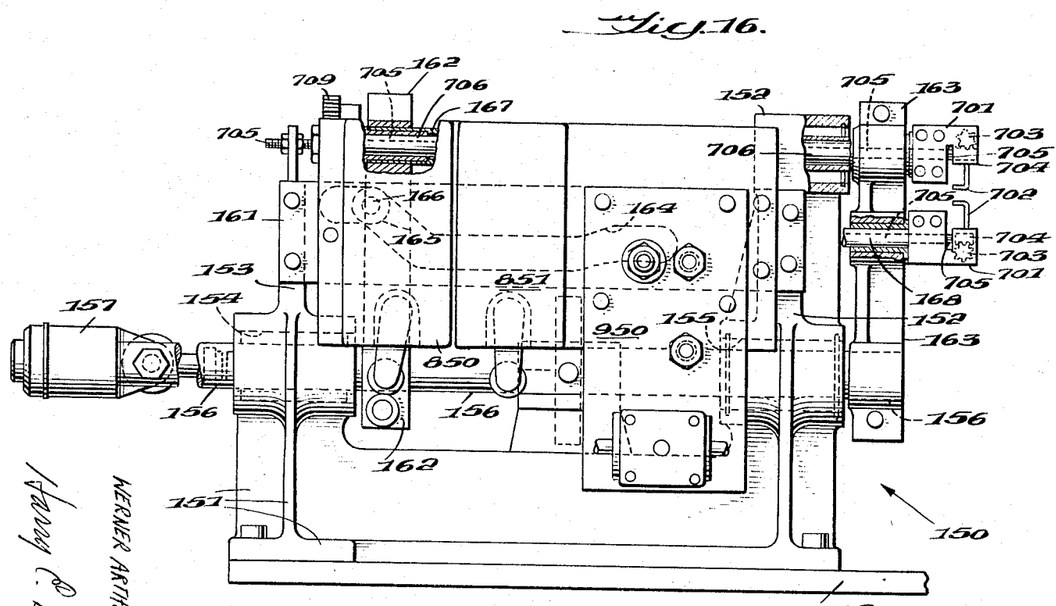
FIGURE 16 is an enlarged side elevational view of a band transfer slide assembly of the bundle banding unit with certain parts broken away.

The main pneumatic conduits, units, and controls are shown in FIGURES 14 and 15. Generally most of the work units are actuated by simple conventional reciprocating pneumatic cylinder piston motor units which are controlled by suitable four-way control valves which are actuated by solenoids. The solenoids are energized and de-energized by means of limit switches which are operated in response to movement of operating parts of the various assemblies. In the system as shown in FIGURE 14, the usual pneumatic or air line valves V, lubricators L, pressure regulator R are provided. One branch of the pneumatic circuit operates the feed clamp actuator 127, the No. 1 compactor 132, cutter head "A," band transfer slide "A," band clamp "A," cutter head "B," band transfer slide "B" and band clamp "B." The other branch operates the rotary table actuator 105, No. 2 compactor, cutter head "C," band transfer slide "C," band clamp "C," cutter head "D," band transfer slide "D" and band clamp "D." The associated four way valves and actuating solenoids are indicated by the reference letters V and S respectively.

FIGURE 15 indicates the location and cooperation of the limit switches which cooperate to maintain synchronism of the many operations to provide a smooth continuous bundling and banding process. In the preferred embodiment shown, limit switch LS–1 is located at the rotary transfer member or index wheel 106 and is activated momentarily after 10° of rotation of member 106 to return the preformer unit elements 54 to their upper position and return the movable cam portion 126' to extended position; limit switch LS–2 is positioned at the receiving end of the conveyor unit and is activated by release of a banded bundle from the transfer clamps of the index wheel 106 to cause the conveyor to move one step in conveying away the banded bundles; limit switch LS–3 is located at the rotary transfer member or index wheel 106 and is activated to close just before index wheel motion stops to initiate the banding operation; limit switch LS–4 is located at the top of the cutter assembly cross head and is activated to close when the head is in the uppermost position, limit switch LS–4 is also interlocked with the circuit for retracting the band transfer slide; limit switch LS–5 is located on the band transfer slide and is activated as the slide and piston 156 extends outwardly to initiate downward movement of the cutter assembly cross head; limit switch LS–6 is located at the furthermost retracted position of the band transfer slide and is closed when slide is retracted to permit movement of the index wheel; limit switch LS–8 is located at the bottom of the cutter assembly cross head stroke and is activated there to cause return upward movement of the cross head and to cause clamping and gripping of the cut band; and switch PS–7 is a pressure sensitive switch in the band transfer slide drive motor cylinder near the limit of the slide extending stroke to cause the slide to return to retracted position should the slide jam against something during the slide extending stroke.

With electrical power and air supply on the sequence of operation is generally as follows, referring to FIGURE 15, (1) A periodic electrical signal from an incoming bristle counter device closes relay which energizes the solenoid controlling the separator blade assembly motor to lower the separator blades 71, 72, 73 and start the cycle of sweep finger 36 to fill the recess or pockets in elements 60

(2) The closing of the above relay initiator (a) the clamping of a bundle in elements 60 by transfer clamps 120, 121; (b) lowers compactors 133; (c) starts rotary transfer member or index wheel 106 movement.

(3) After preferably 10° of index wheel 106 movement, limit switch LS–1 closes momentarily to return clamping cam portion 126' to open clamp member position and restores finger elements 54 to upper position (4) Just before index wheel 106 comes to rest, limit switch LS–3 closes to (a) initiate the banding cycle (which comprises band tube feeding, cutting, band clamping and gripping); (b) raises the compactors 133

(5) With banding cycle under way, (a) the cut band D is released on to the transfer fingers 702 and (b) the transfer slide assembly extends toward the bundle (6) As the band transfer slide activates limit switch LS–5 the cutting assembly cross head 172 starts down to cut a single band D from the continuous band tube S.

(7) When the cutting assembly cross head 172 actuates LS–8 the cross head is returned upwardly and simultaneously the cut band D is clamped, gripped and extended to the triangular configuration shown in FIGURE 10.

(8) With the cutter assembly cross head in the up position, activation of switch PS–7 causes the slide to be returned to pick up the next band.

The preceding steps are carried out at each banding station, two opposed banding stations being operated substantially simultaneously.

At the third indexing movement of index wheel 106 the fully banded bundle is released on the conveyor which activates limit switch LS–2 to move the conveyor through one indexing movement.

It is believed clear that applicant has provided a novel, effective, and improved apparatus for continuously forming bundles and banding the same, in accordance with the objects of the invention and that the functioning of the apparatus is clear from the foregoing discussion, description, and accompanying drawings.

While applicant has provided a detailed description of a preferred embodiment of his invention, many modifications and variations within the spirit of the invention will be obvious to those skilled in the art and all such are considered to fall within the scope of the following claims:

I claim:

1. Apparatus for forming bundles of elongated elements and applying elastic bands thereto, said apparatus comprising in combination: a first means for receiving a continuous stream of elongated elements and conveying said elements in a given path in a given direction from a first position to a second position, said first means constructed and arranged to convey said elements in substantially parallel relationship with each other with their elongated dimension substantially perpendicular to the given direction, a second means positioned adjacent said given path between said first and said second positions, cooperating with said first means to engage said stream of elements to separate said continuous stream of elements into a series of separate groups of parallel elements, a third means positioned adjacent said given path and said second position for receiving and compacting each group of elements into a compact bundle of laterally aligned substantially parallel elements, a fourth means positioned adjacent said second position for conveying said compact bundles from said second position through a banding zone to a third position, a fifth means positioned in said banding zone for applying at least one band element around the outer periphery of each bundle to maintain each bundle in compact form, a sixth means adjacent said third position for removing said banded bundles from said banding zone, a seventh means cooperating with the other means for operating said other means in predetermined timed relationship to carry out said element separating and bundle-banding operations continuously and automatically.

2. The apparatus of claim 1 in which said fifth means comprises a feed mechanism for feeding an annular strip of band material to a cutting position, a cutter mechanism cooperating with said feed mechanism for cutting said strip at said cutting position to form band elements, and a transfer mechanism for transferring said cut band elements from said cutting position into engagement around the outer periphery of said bundles as they pass through said banding zone.

3. The apparatus of claim 1 in which said third means comprises a bundle-forming pocket mechanism, an element transfer mechanism for transferring said groups of elongated elements from said first means to said pocket mechanism while maintaining the elements of each group in substantially parallel relation to each other.

4. The apparatus of claim 3 in which said third means further comprises a vibratory device operatively connected to said pocket mechanism for compacting elongated elements positioned in said pocket mechanism.

5. The apparatus of claim 2 in which said fifth means further comprises a band-gripping mechanism cooperating with said mechanism and said transfer mechanism for engaging and gripping said band in at least three spaced points as it is cut by said cutter means, said band-gripping mechanism actuatable to open and extend the engaged band element at said spaced points to facilitate engagement of said band element by said transfer mechanism for transfer to a bundle of said elements.

6. The apparatus of claim 1 in which said first means is provided with a long element removing mechanism positioned adjacent said given path for engaging and rapidly extracting from said stream filaments with end portions projecting significantly beyond the lateral limits of said stream of elements.

7. An improved apparatus for forming narrow annular band elements having transverse dimensions very small relative to the elongated circumferential dimension from a continuous elongated flexible thin walled tubular member and extending the band for engagement by a band transfer mechanism, said apparatus comprising in combination a frame structure, a movable member mounted in said frame structure for movement between a first and a second position, means connected to said movable member for moving said member between said first and second positions, a second member mounted in said frame structure adjacent said second position, said second member provided with a first cutter element, a second cutter element mounted on said movable member and aligned with said first cutter element so that said cutter elements are moved into cooperative cutting relationship when said movable member is in said second position, a feeding mechanism mounted in said frame structure in cooperation with said members and cutter elements for periodically feeding an elongated tubular member into position between said cutter elements to be cut to form a narrow annular band element when said movable member is moved to said second position, said movable member provided with a cut band element positive gripping mechanism adjacent said first cutter element for gripping a portion of one side of said cut band element intermediate its ends after the band element has been severed from the tube member as the movable member moves to its second position, a cut band positive clamping mechanism mounted in said supporting frame structure in cooperation with said cutter elements and said gripping mechanism for positively clamping the end portions of said cut band element after it has been severed from the tube member, actuating means mounted in said frame structure cooperating with the clamping and gripping mechanism for actuating, the clamping mechanism and said gripping mechanism into their operative positions as aforesaid, said clamping and gripping mechanisms cooperating to extend the band element into a triangular configuration as said first member moves from its second toward its first position to expedite transfer of the band for further handling, and means mounted in said frame structure cooperating with the clamping and gripping mechanisms for releasing the clamping and gripping mechanisms from their positive engagement with the band element after its extension.

8. The improved apparatus of claim 7 in combination with a movable transfer means for engaging the band element while maintained in its extended configuration by said clamping and gripping mechanisms, and transferring the band element in extended configuration after its release from the clamping and gripping mechanisms, into position around the periphery of a bundle of elongated articles and means for terminating engagement of said transfer means with said band element.

9. Apparatus for forming bundles of elongated elements and applying elastic bands thereto, said apparatus comprising in combination; a first means positioned adjacent a given first position for receiving and conveying bundles of substantially parallel elongated elements from said first position through a banding zone to a second position, a second means positioned in said banding zone for applying at least one band element around the outer periphery of each bundle to maintain each bundle in compact form, a third means adjacent said second position for removing said banded bundles from said banding zone, a fourth means cooperating with the other means for operating said other means in predetermined timed relationship to carry out said bundle-banding operations continuously and automatically, said second means comprising a feed mechanism for feeding an annular strip of band material to a cutting position, a cutter mechanism cooperating with said feed mechanism for cutting said strip at said cutting position to form band elements, and a transfer mechanism for transferring said cut band elements from said cutting position into engagement around the outer periphery of said bundles as they pass through said banding zone, said second means further comprising a band-gripping mechanism cooperating with said cutter mechanism and said transfer mechanism for engaging and gripping said band in at least three spaced points as it is cut by said cutter means, said band-gripping mechanism actuatable to open and extend the engaged band element at said spaced points to facilitate engagement of said band element by said transfer mechanism for transfer to a bundle of said elements.

References Cited by the Examiner

UNITED STATES PATENTS

| | | | |
|---|---|---|---|
| 353,866 | 12/1886 | Kinney et al. | 53—198 X |
| 1,969,160 | 8/1934 | Slusher | 53—198 |
| 2,089,769 | 8/1937 | Strout | 53—198 X |
| 2,285,715 | 6/1942 | Hoptkins | 53—198 X |
| 3,186,333 | 8/1965 | Hoffman et al. | 100—9 |
| 3,217,461 | 11/1965 | Wheelock | 100—9 X |

FRANK E. BAILEY, *Primary Examiner.*

L. S. BOUCHARD, *Assistant Examiner.*

UNITED STATES PATENT OFFICE
CERTIFICATE OF CORRECTION

Patent No. 3,288,055

November 29, 1966

Werner Arthur Vellrath

It is hereby certified that error appears in the above numbered patent requiring correction and that the said Letters Patent should read as corrected below.

Column 11, line 27, before "mechanism" insert -- cutter --.

Signed and sealed this 12th day of September 1967.

(SEAL)
Attest:

ERNEST W. SWIDER
Attesting Officer

EDWARD J. BRENNER
Commissioner of Patents